United States Patent [19]
McCormick

[11] Patent Number: 5,366,433
[45] Date of Patent: Nov. 22, 1994

[54] SAFETY CLUTCH AND ITS USE IN CAPPING MILK CARTONS

[76] Inventor: Charles M. McCormick, 122 Cherokee Hills Dr., Antioch, Tenn. 37013

[21] Appl. No.: 80,814
[22] Filed: Jun. 24, 1993
[51] Int. Cl.5 .................. B31B 3/84; B31B 1/90; F16D 7/00; F16D 43/20
[52] U.S. Cl. ........................ 493/38; 493/33; 493/87; 192/56 R; 53/133.2; 156/379.8; 156/352; 156/556
[58] Field of Search ............. 493/3, 30, 33, 38, 87, 493/102; 53/133.2; 156/379.8, 352, 365, 458, 556; 192/56 R

[56] References Cited
U.S. PATENT DOCUMENTS

| | | | |
|---|---|---|---|
| 2,831,383 | 4/1958 | Riess | 192/56 R |
| 2,837,190 | 6/1958 | Blakeslee | 192/56 R |
| 2,872,004 | 2/1959 | Barker et al. | 192/56 R |
| 2,885,918 | 5/1959 | Allimann | 192/56 R |
| 2,910,846 | 11/1959 | Butterfield et al. | 192/56 R |
| 3,385,248 | 5/1968 | Klausmann et al. | 493/87 |
| 3,690,223 | 9/1972 | Klausmann et al. | 493/87 |
| 3,877,253 | 4/1975 | Yeagle | 192/56 R |
| 4,056,047 | 11/1977 | Grimm | 493/102 |
| 4,401,308 | 8/1983 | Sakaguchi et al. | 192/56 R |
| 4,788,811 | 12/1988 | Kawajiri et al. | 493/87 |
| 5,219,320 | 6/1993 | Abrams et al. | 493/87 |
| 5,267,934 | 12/1993 | Pape et al. | 493/87 |

FOREIGN PATENT DOCUMENTS 909052  9/1972  Canada .................. 493/87

Primary Examiner—William E. Terrell

[57] ABSTRACT

A safety clutch which has a steel ball which is adapted to move from half in a hemispherical recess in its drive plate and half in a cylindrical hole in its driven plate to a position completely in the cylindrical hole. A conveyor conducts milk or like cartons to a point where caps are ultrasonically welded to the inside of the foldable tops of the cartons. The safety clutch discontinues power in the event of an overload.

3 Claims, 2 Drawing Sheets

SAFETY CLUTCH AND ITS USE IN CAPPING MILK CARTONS

BACKGROUND OF THE INVENTION

1. Field of the Invention

This invention relates to a safety clutch. More particularly, it relates to a safety clutch for use in putting spout caps on milk cartons.

2. Description of the Prior Art

Putting spout caps on milk cartons has heretofore been done by means of a sprocket and chain arrangement. However, there have been difficulties in operating an assembly line to do this, especially because of not having a clutch suitable for such an operation and one which does not cause problems when a malfunction occurs.

SUMMARY OF THE INVENTION

After extended investigation I have come up with an improved clutch which has a sprocket radially outside a circular clutch drive plate which is in turn radially outside a retaining plate for the clutch drive plate and a steel ball arrangement. When the clutch is operating, one half of the steel ball is in a hemispherical recess in the clutch drive plate and the other half in a cylindrical hole in a clutch driven plate. When a malfunction occurs anywhere in the process of capping milk cartons, the steel ball moves into the cylindrical hole to stop the entire operation.

The clutch is connected to a shaft having a sprocket arrangement which is operationally connected to a double chain drive. The double chain drive carries the milk cartons to push them into a position where an anvil arm rotating around a shaft picks up the caps one-by-one from a gravity feed and presents them to a pneumatically operated ultrasonic welding horn which welds them to the inside of the tops of the milk cartons as they are pushed into position one by one. A central timing device and associated relays control milk carton movement, cap placement and the welding operation.

BRIEF DESCRIPTION OF THE DRAWING

For a better understanding of my invention reference will now be made to the drawing, in which.

DETAILED DESCRIPTION

Figure 1:
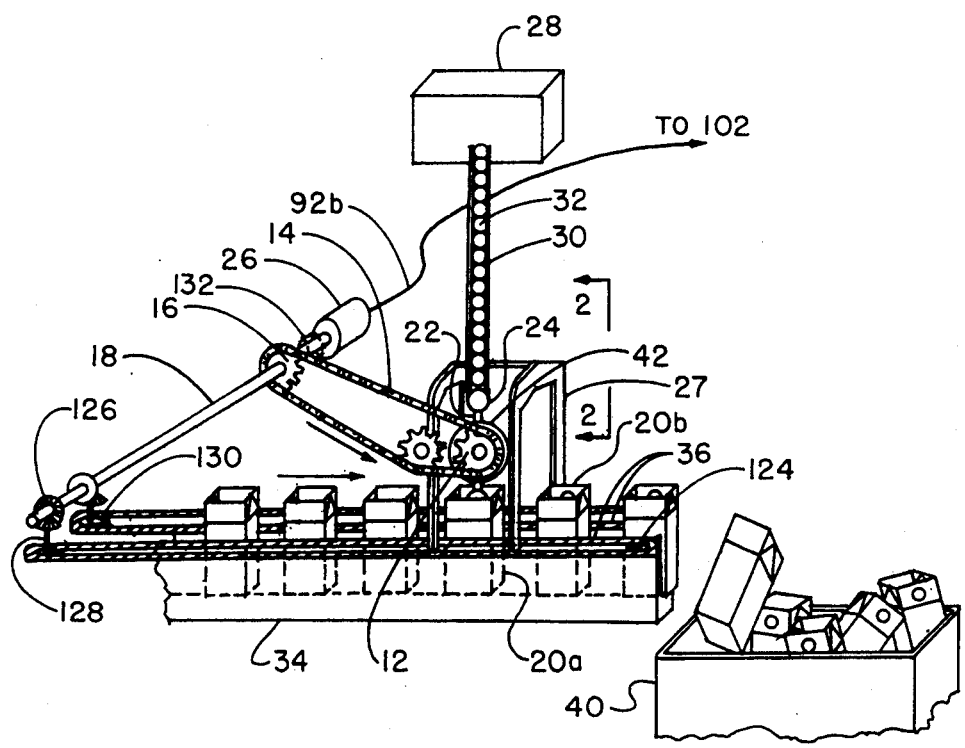
FIG. 1 is a perspective view of a spout cap installation apparatus in which the clutch of the invention is designed to be used.

The milk carton spout capping apparatus 10 having framing therefor 27 with a framing cover 48 is run by the double drive line 36 of carton conveyor line 34 (driven by an extension of clutch sprocket 12) which conducts cartons 20a under spout cap anvil 24 (which has spout cap anvil arm 22 associated therewith) which is stopped momentarily with anvil arms 22 in vertical position when carton 20a is in position and ready to be capped. Spout cap handling head 50 picks up a spout cap 32 from gravity wire track 30 and puts it onto anvil 34 as anvil 34 and chain drive 36 move in timed relationship to one another to bring cap 32 and carton 20b into position for welding the spout cap onto the inside of the top of the carton 20a. At the same time, with a proper setting of the timing device 102, ultrasonic welding horn 74 moves against spout cap 32 (previously on lower anvil 24a) and thrusts through the wall of carton 20a, upon which an ultrasonic vibration from ultrasonic generator 68 is delivered to spout cap 32 to weld it to the inside of the foldable top of the carton 20a as carton conveyor line 34, and anvil 24 (the latter moving at right angles and rotating 180 degrees between momentary stops for welding), with the capped cartons 20b being pushed on along the conveyor line 34 to receiving bin 40 for finished cartons 20b, the moving of caps 32, the delivery of the cartons 20a to the point of welding and the welding by the welding horn 74 all being timed by the central timing device and associated relay controls 102 so that each operation occurs at the proper time and place.

Figure 2:
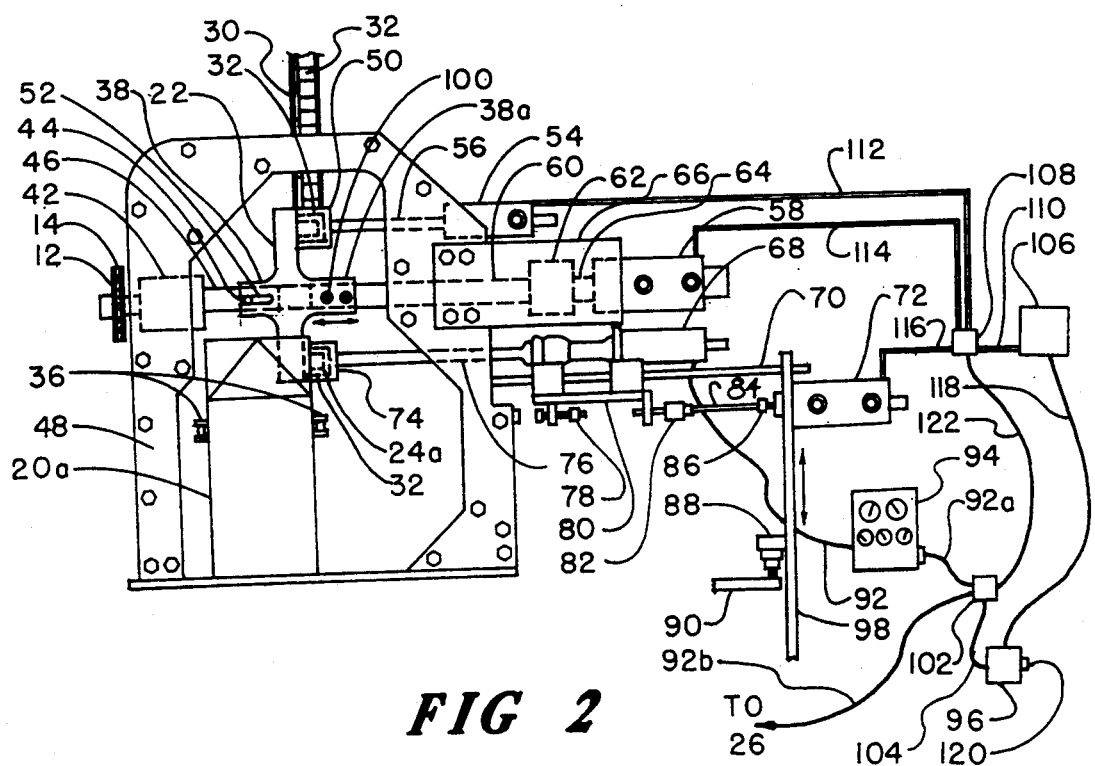
FIG. 2 is a side elevation view of the clutch-operated spout cap installation apparatus of the invention shown in FIG. 1.
Figure 3:
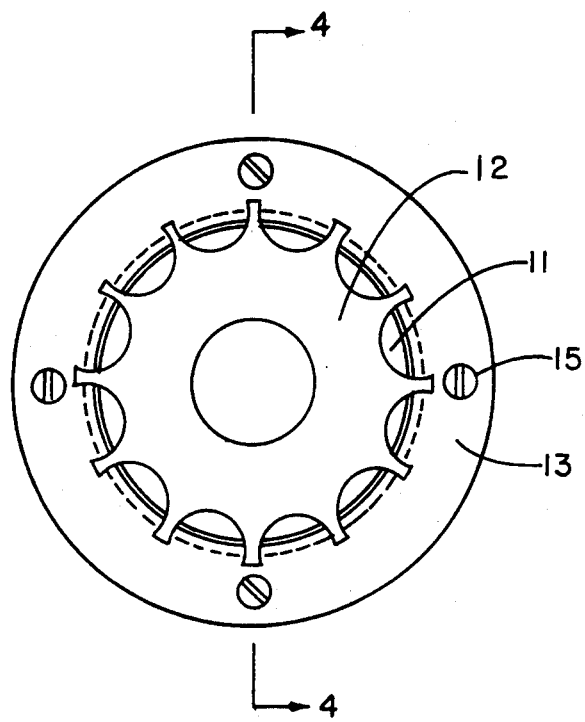
FIG. 3 is a side view of the clutch of the invention with respect to the turning direction of the sprocket.
Figure 4:
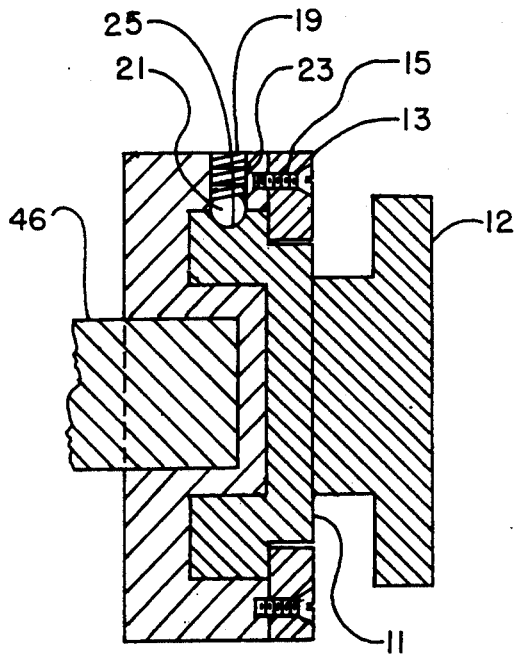
FIG. 4 is a cross section taken at 4—4 of FIG. 3 showing the position of the clutch ball in its normal operating position.
Figure 6:
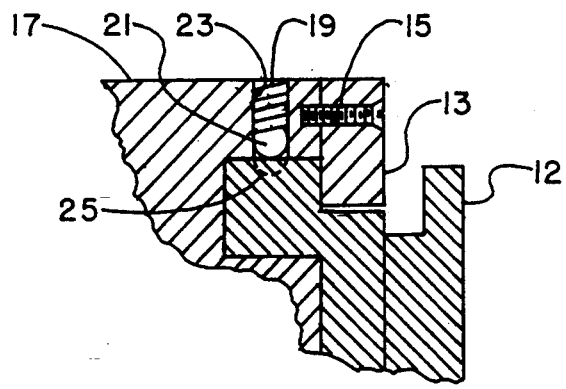
FIG. 6 is a breakaway of FIG. 4 except for showing the ball of the clutch as it is positioned after a malfunction.

Further with respect to the running of the milk carton capping operation of the invention, clutch 42 as shown in FIGS. 1 and 2 is depicted in FIGS. 4 and 6 as driving a central driven shaft 46 having a pin 44 anchored therein and a driven plate 17 next to a drive plate 11, which has a retaining plate 13 with retaining screws 15 therefor and outside of which is a clutch sprocket 12. Inside cylindrical hole 23 in driven plate 17 is a coil spring 19 above ball 21, which, during operation of the clutch, is half in hole 23 and half in a hemispherical recess 25 in drive plate 11, and moves to a position such that it is completely in cylindrical hole 23 if a malfunction occurs in any operation in which it is being used. The clutch 42 can be easily re-engaged or returned to the operating position, with the ball placed back in its operating position of half in the cylindrical hole 23 and half in the hemispherical recess 25.

When clutch 42 is being used in a carton capping operation apparatus such as depicted in FIGS. 1 and 2, clutch sprocket 12 turns chain 14. Spout caps 32 drop from bin 28 via track 30 and are picked up by handling head 50 and delivered to spout cap anvil arm 22 and associated spout cap anvils 24, 24a to where they are welded one by one by welding horn 74. Hub 38, 38a is for rotating spout cap anvil arm 22 which carries anvils 24, 24a with caps 32 to the welding position. Shaft 46 is parallel to welding horn shaft 76 at an end of which is ultrasonic welding generator 68 and at the other end of which is ultrasonic welding horn 74, which is shown welding a spout cap 32 from anvil 24a on carton 20a. Spout cap handling head 50 picks up and delivers spout cap 32 to anvil 24a as it is received from wire track gravity feed 30. 48 serves as a frame.

Concerning the electric and pneumatic lines and related parts which supply the power for operating the safety clutch 42 and capping machinery of the invention, with respect to energy going to and from motor 26, line 92b leads to electrical timer relay 102, which controls motor 26. Pneumatic valve control 108 is joined to air compressor 106 by pneumatic line 110.

Electric line 118 leads from power source 96, which has an on-off electrical switch 120, to air compressor 106. Electric line 104 goes from electric timer relay 102 to power source 96. Line 92a from electrical timer relay 102 leads to welding transformer 94, from which line 92 leads to ultrasonic welding generator 68. Electrical line 122 leads from electrical timer relay 102 to pneumatic valve control box 108. Welding horn shaft 76 has a horizontal stop adjustment 78, a moving platform 80 which has a height adjuster 88 and is on a vertical structural member 98 and has a stationary guide rod 70 for ultrasonic welding, a self-aligning adaptor 82 and a horizontal drive shaft adjustment 86 on structural member 90 in association therewith.

Figure 5:
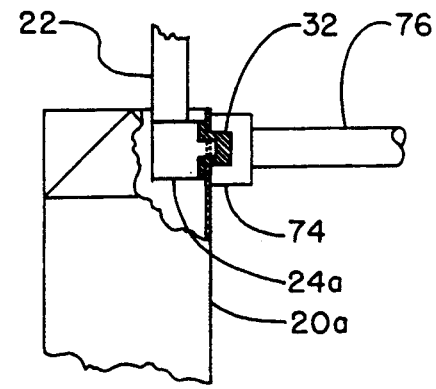
FIG. 5, shown partly in cross section, depicts how the spout cap arm installs a spout cap in cooperation with a welding arm shaft by dipping down inside the top part of a milk carton.

Continuing as to pneumatic and related operations, cylinder 54 is in association with driveshaft 56 for running spout cap handling head 50. Another cylinder 58, in association with driveshaft 60, rotates with hub 38, 38a and is in line with driveshaft 64, which moves horizontally and has a structural plate 66. A third cylinder 72, associated with a driveshaft 84 has a horizontal driveshaft adjustment 86 associated with an ultrasonic welding generator 68 in line with ultrasonic welding horn 74 on shaft 76, as seen in FIG. 5, spout caps 32 supplied by spout cap anvil arm 22 and its anvil 24a to the inside of the top of cartoon 20a, are welded on the inside of the folding top thereof by the welding horn 74 on shaft 76.

Vertical structural member 98 is used for moving platform 80 used in this ultrasonic welding portion of the spout capping operation which employs the safety clutch 42 of the invention. Also depicted in the capping operation drawing (FIGS. 1 and 2) are lock screws 100 for tightening hub 38a against driveshaft 60 and an on-off power switch 120 for starting or stopping the capping operation at any time.

Cylinder 58 is supplied with air by pneumatic line leading from pneumatic valve control box 108 supplied by air compressor 106 and is on driveshaft 64 next to a rotary union 62 coupling non-rotating, horizontal driveshaft 64 with rotating driveshaft 60, which rotates with hub 38,38a. Pneumatic cylinder 54 gains it air supply via pneumatic line 112 from pneumatic valve control box 108.

Further with respect to safety clutch 42 of the invention, it drives shaft 46 by means of a clutch sprocket 12, which is driven by a drive chain 14 run by electric motor 26. To temporarily stop rotation of driveshaft 18, cam drive control 132 is used as alternate means for temporarily stopping rotation of drive shaft 18. Bevel gears 126 change the plane of rotation from vertical to horizontal via vertical driveshafts 128, which go to drive sprockets 130 for double drive chains 36 (having an idle sprocket 124], which convey the cartons 20a, 20b via the capping steep to the receiving bin 40.

While the invention has been described in terms of preferred embodiments, the claims appended hereto are intended to encompass all embodiments which fall within the spirit of the invention.

Having thus described my invention and certain preferred embodiments thereof, I claim:

1. A safety clutch comprising a sprocket, an inner disc plate axially adjacent and rigidly connected to said sprocket for corotation therewith, a shaft, an outer disc plate axially adjacent and rigidly connected to said shaft for corotation therewith, a retaining plate adjacent said sprocket for retaining said inner disc plate in said outer disc plate, a radially facing hemispherical recess in an outer circumference of said inner disc plate, a radially extending cylindrical bore opening into an inner circumference of said outer disc plate, a spring received in said cylindrical bore, and a ball received in said hemispherical recess, said spring holding said ball engaged in said hemispherical recess when the torque load between said sprocket and said shaft is within a predetermined range so that said inner and outer disc plates are corotational and said hemispherical recess moving said ball radially outwardly against said spring and into said bore when the torque load exceeds a predetermined range so that said inner and outer disc plates are relatively rotatable.

2. A trouble-free process for spout capping cartons which comprises employing a safety clutch having a steel ball half in a cylindrical hole in a clutch driven plate and half in a hemispherical recess in a clutch drive plate and adapted to slip entirely into said cylindrical hole in the event of a malfunction, conducting cartons to a capping point with a double-chain drive, driving a rotating anvil arm with said safety clutch so that said rotating anvil arm receives and picks up spout caps delivered by a gravity conveyor and dips them into an open top of a milk carton welding the caps to the inside of said carton with an ultrasonic welding horn at the capping point, and collecting the spout-capped cartons.

3. Apparatus for capping cartons, comprising conveying means for conveying cartons along a path, applying means along the path for applying spout caps to the cartons, and drive means for driving said conveying means, said drive means including a safety clutch comprising a sprocket, a circular clutch drive plate adjacent said sprocket, a retaining plate adjacent said circular clutch drive plate for retaining said drive plate, a clutch driven shaft, a clutch driven plate encircling said clutch driven shaft, and a steel ball adapted to move from a position half in a hemispherical recess in said clutch drive plate, and half in a cylindrical hole in said clutch driven plate to a position entirely in said cylindrical hole for stopping the capping of the cartons in the event of a malfunction.

* * * * *